(12) United States Patent
Ferenczi

(10) Patent No.: US 12,132,836 B2
(45) Date of Patent: Oct. 29, 2024

(54) VERIFIED PRESENTATION OF NON-FUNGIBLE TOKENS

(71) Applicant: American Express Travel Related Services Company, Inc., New York, NY (US)

(72) Inventor: Andras L. Ferenczi, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 266 days.

(21) Appl. No.: 17/559,302

(22) Filed: Dec. 22, 2021

(65) Prior Publication Data
US 2023/0198760 A1  Jun. 22, 2023

(51) Int. Cl.
| | |
|---|---|
| H04L 9/32 | (2006.01) |
| G06F 16/951 | (2019.01) |
| H04L 9/08 | (2006.01) |
| H04L 9/00 | (2022.01) |

(52) U.S. Cl.
CPC .......... *H04L 9/3213* (2013.01); *G06F 16/951* (2019.01); *H04L 9/0825* (2013.01); *H04L 9/3247* (2013.01); *H04L 9/50* (2022.05); *H04L 2209/56* (2013.01); *H04L 2209/80* (2013.01)

(58) Field of Classification Search
CPC ... H04L 9/3213; H04L 9/0825; H04L 9/3247; H04L 9/50; H04L 2209/56; H04L 2209/80; H04L 9/3234; H04L 9/3271; G06F 16/951
See application file for complete search history.

(56) References Cited

U.S. PATENT DOCUMENTS

| | | | | |
|---|---|---|---|---|
| 11,075,891 | B1* | 7/2021 | Long | H04L 9/3213 |
| 11,616,650 | B1* | 3/2023 | Panjwani | H04L 9/3247 |
| | | | | 713/168 |
| 2016/0092988 | A1* | 3/2016 | Letourneau | G06Q 20/223 |
| | | | | 705/66 |
| 2017/0243179 | A1* | 8/2017 | Dehaeck | G06Q 20/123 |
| 2021/0295324 | A1* | 9/2021 | Kerseboom | H04L 9/3239 |
| 2022/0309491 | A1* | 9/2022 | Shapiro | G06Q 30/08 |
| 2022/0351195 | A1* | 11/2022 | Quigley | G06Q 20/36 |

(Continued)

FOREIGN PATENT DOCUMENTS

KR  10-2100457  4/2020

OTHER PUBLICATIONS

International Search Report and the Written Opinion in PCT/US2022/082092 mailed May 1, 2023.

*Primary Examiner* — J. Brant Murphy
(74) *Attorney, Agent, or Firm* — Thomas Horstemeyer, LLP

(57) ABSTRACT

Disclosed are various embodiments for verifying the presentation of media represented by non-fungible tokens (NFTs). A presentation device can receive a smart contract address and a non-fungible token (NFT) identifier from a client device. The presentation device can then execute a function of a smart contract located at the smart contract address to obtain the owner address for the NFT, wherein the NFT identifier is provided as an argument to the function of the smart contract. Subsequently, the presentation device can validate the owner address for the NFT. Then, in response to validation of the owner address for the NFT, the presentation device can present the media file represented by the NFT.

20 Claims, 3 Drawing Sheets

(56) References Cited

U.S. PATENT DOCUMENTS

| | | | | |
|---|---|---|---|---|
| 2022/0353082 A1* | 11/2022 | Busch | ............... | H04L 9/3247 |
| 2022/0370778 A1* | 11/2022 | Azdoud | ............... | G06F 21/16 |
| 2023/0067155 A1* | 3/2023 | Jackson | ............... | H04L 9/50 |
| 2023/0120476 A1* | 4/2023 | Baskin | ............... | G06Q 20/3672 |
| | | | | 705/66 |
| 2023/0130182 A1* | 4/2023 | Mir | ............... | H04L 9/3297 |
| | | | | 713/189 |
| 2023/0144092 A1* | 5/2023 | Pierce | ............... | H04L 9/3247 |
| | | | | 726/26 |

* cited by examiner

VERIFIED PRESENTATION OF NON-FUNGIBLE TOKENS

BACKGROUND

Digital media can often be copied and pasted. For example, an image file could be copied or duplicated with ease, as could other files representing other types of media (e.g., video, audio, etc.). Accordingly, it can be difficult to distinguish between an original work of an artist and a copy of the work when the work is recorded in a digital medium. For instance, if a digital picture frame were displaying a digital picture, it would be difficult for a viewer to tell whether he or she is viewing the original picture or a copy.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for verifying the presentation of digital media that is represented by a non-fungible token (NFT). In various embodiments of the present disclosure, a user can submit an NFT representing digital media to a presentation device. The presentation device can then evaluate the NFT to determine whether it is authorized to present the digital media associated with the NFT. In other embodiments of the present disclosure, a user can obtain with her or her client device information about a presentation device and the NFT associated with the digital media being presented. The client device can then confirm that the presentation device is authorized to present the digital media associated with the NFT. As a result, a user can determine whether he or she is consuming the original copy of a digital media file or a (potentially unauthorized) duplicate.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
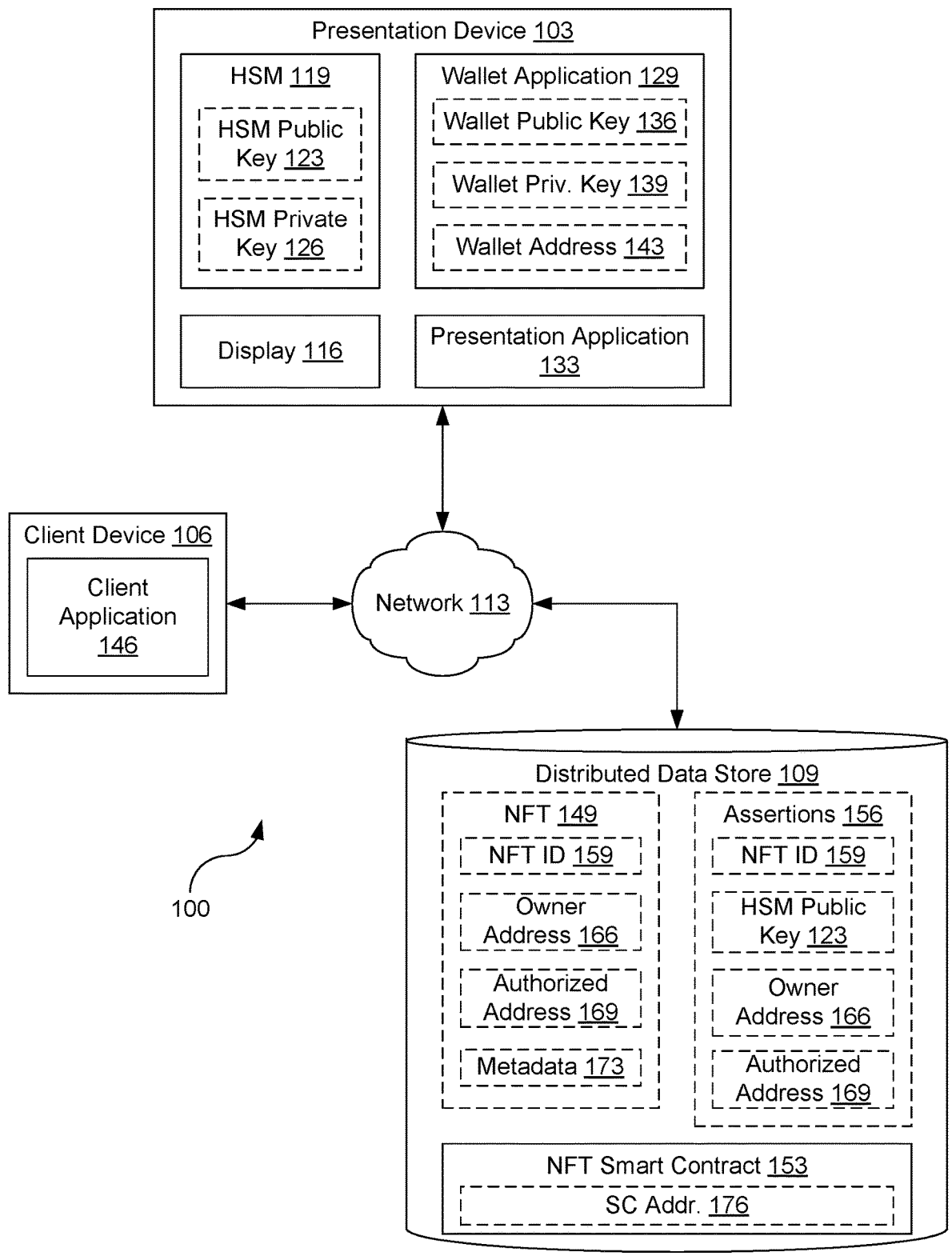
FIG. 1 is a drawing of a network environment according to various embodiments of the present disclosure.

FIG. 1 depicts a network environment 100 according to various embodiments. The network environment 100 can include a presentation device 103, a client device 106, and a distributed data store 109, which can be in data communication with each other via a network 113.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The presentation device 103 can represent any computing device capable of presenting digital media. Accordingly, the presentation device 103 could include memory storing machine-readable instructions that, when executed by a processor, cause the presentation device 103 to perform various actions. Examples of presentation devices 103 can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, a digital picture frame, a smart speaker, or other devices with like capability. In some instances, the presentation device 103 can include one or more displays 116, such as liquid crystal displays (LCDs), gas plasma-based flat panel displays, organic light emitting diode (OLED) displays, electrophoretic ink ("E-ink") displays, projectors, or other types of display devices. In some instances, the display 116 can be a component of the presentation device 103 or can be connected to the presentation device 103 through a wired or wireless connection.

The presentation device 103 can also include a hardware security module (HSM) 119, which is a dedicated microcontroller that secures hardware using integrated cryptographic keys and provides support for various cryptographic operations or primitives. This can include performing various cryptographic functions on behalf of the presentation device 103 or applications executed by the presentation device 103. To perform these cryptographic operations, the HSM 119 can include an HSM public key 123 and a respective HSM private key 126. Although the HSM public key 123 may be made freely available by the HSM 119 to any applications executing on the presentation device 103, the HSM private key 126 can be kept securely within the HSM 119 such that it is inaccessible and unreadable by other processes executing on the presentation device 103 or other components of the presentation device 103. For example, the HSM 119 could sign an arbitrary piece of data using the HSM private key 126, and provide the signature to another application without disclosing the HSM private key 126. As another example, the HSM 119 could decrypt data that was previously encrypted using the HSM public key 123 without disclosing the HSM private key 126.

Various applications or other functionality can be executed by the presentation device 103. These components can include a wallet application 129, a presentation application 133, and other applications, services, processes, systems, engines, or functionality not discussed in detail herein.

The wallet application 129 can be executed to facilitate interactions by the presentation device 103 with the distributed data store 109. This can include authorizing transactions on behalf of the presentation device 103. Accordingly, the wallet application 129 can be associated with a wallet public key 136 and a respective wallet private key 139, which allow the wallet application 129 to authorize or validate transactions occurring on the distributed data store 109. The wallet application 129 can also be associated with a wallet address 143, which acts as an identifier of the presentation device 103 for transactions recorded by or involving the distributed data store 109. In some implementations, the wallet address 143 can be derived from the wallet public key 136 (e.g., by applying a cryptographic hash function to the wallet public key 136).

The presentation application 133 can be executed to present media to using the presentation device 103. For example, the presentation application 133 could cause images or video to be shown on the display 116 of the presentation device 103. As another example, the prestation application 133 could cause an audio file (e.g., music, a speech, etc.) to be played through a speaker of the presentation device 103.

The client device 106 is representative of a plurality of client devices that can be coupled to the network 113. A client device 106 can include a processor, a memory, a network interface, and other components. Examples of client devices 106 include mobile devices (e.g., smartphones, mobile phones, tablet computes, etc.), personal computers (e.g., desktops, laptops, etc.), and similar devices.

The client device 106 can be configured to execute various applications such as a client application 146 or other applications. The client application 146 can be executed in a client device 106 to communicate with the presentation device 103. To this end, the client application 146 can include a browser, a dedicated application, or other executable. The client device 106 can be configured to execute applications beyond the client application 146 such as email applications, social networking applications, word processors, spreadsheets, or other applications.

Also, various data is stored in a distributed data store 109. The distributed data store 109 represents a data storage network that is formed from multiple computing devices acting as nodes in the data storage network. In some implementations, any computing device could participate as a node of the distributed data store 109, including one or more client devices 106 or one or more presentation devices 103. In general, each node can store a copy of the data stored in the distributed data store 109. When data is to be written to the distributed data store 109, each node can communicate with other nodes of the distributed data store 109 to validate and/or coordinate the storage of new records or data to the distributed data store 109. An illustrative example of a distributed data store 109 could be a blockchain which uses a proof-of-work, proof-of-stake, or proof-of-authority protocol to validate new blocks of data stored on the blockchain. Various types of data can be stored by the distributed data store 109. This can include one or more non-fungible tokens (NFT) 149, non-fungible token (NFT) smart contracts 153, and/or one or more assertions 156.

An NFT 149 can represent a non-fungible data structure stored in the distributed data store 109, such as a blockchain, distributed ledger, or similar data store. Because an NFT 149 is non-fungible, it can be used for a variety of purposes where fungibility is undesirable. For example, an NFT 149 could be used to represent ownership or control of an asset, such as a non-fungible digital or physical item (e.g., a video, image, audio file, etc.). The NFT 149 can be structured or formatted to comply with various standards or protocols for non-fungible tokens. Examples of such standards include the ETHEREUM ERC-721 standard, ETHEREUM ERC-1155 standard, the FLOW blockchain NFT standard, the SOLANA blockchain NFT standard, etc. Because an NFT 149 is unique and non-fungible, each NFT 149 can also have an NFT identifier 159, which can represent a unique identifier for a respective NFT 149 that uniquely identifies the NFT 149 with respect to other NFTs 149. The NFT identifier 159 can be formatted in various ways, depending on which standard the NFT 149 complies with. An NFT 149 can also be associated with an owner address 163, which identifies the address of the owner of the NFT 149, and an authorized address 169, which identifies the address of an individual or entity authorized to perform various actions with the NFT 149 (e.g., sell, transfer, display, etc.). An NFT 149 can also include metadata 173, such as a URL specifying the location of a digital file represented by the NFT 149, a hash of the digital file represented by the NFT 149, etc.

A non-fungible token (NFT) smart contract 153 can be stored in or hosted by the distributed data 109. Smart contracts are executable programs that are both stored in the distributed data store 109 and executable by the nodes of the distributed data store 109. A smart contract can be executed automatically when one or more predetermined conditions are met. Functions provided by a smart contract can also be called or invoked by a node of the distributed data store 109 or a client interacting with the distributed data store 109. In various embodiments of the present disclosure, the NFT smart contract 153 could be executed to create one or more NFTs 149 according to one or more predefined parameters and/or one or more arguments passed as input values to the NFT smart contract 153. The NFT smart contract 153 could also be executed to provide information about a specified NFT 149 in response to a query (e.g., the owner address 166, authorized address, and/or the metadata 173, etc.). The NFT smart contract 153 could also be executed or invoked to transfer ownership of an NFT 149 (e.g., by updated the owner address 166), to update the authorized address 169 for the NFT 149, to update the metadata 173 of the NFT 149, or perform other operations on the NFT 149.

The NFT smart contract 153 can also have a smart contract address 176. The smart contract address 176 can be used to uniquely identify a smart contract hosted by the distributed data store 109 from other smart contracts. The smart contract address 176 can be use to reference the NFT smart contract 153 (e.g., in order to invoke a function provided by the NFT smart contract 153).

One or more assertions 156 can be stored in the distributed data store 109. Each assertion 156 can represent an authorization by an individual associated with the owner address 166 or the authorized address 169 of an NFT 149 for the presentation device 103 associated with the HSM public key 123 to present the media represented by the NFT 149. Accordingly, individual assertions 156 can include an HSM public key 123, an owner address 166 and/or an authorized address 169.

Next, a general description of the operation of the various components of the network environment 100 is provided. Although the following description provides one example of the interactions between the various components of the network environment 100, other interactions are possible. Additional detail about the operation of the individual components and the interactions between the individual components is provided in the discussion accompanying the sequence diagrams of FIGS. 2 and 3.

To begin, a user could setup his or her presentation device 103. As part of the setup process, the user could setup or register the wallet application 129 executed by the presentation device 103 to interact with his or her wallet address 143. This allows the wallet application 129 to sign, authorize, or confirm transactions associated with the wallet address 143 of the user.

Subsequently, a user of a client device 106 could connect his or her client device 106 to the presentation device 103. For example, the user could pair his or her mobile phone with the presentation device 103 via BLUETOOTH. Once connected, the user of the client device 106 could use a client application 146 to provide a smart contract address 176 and an NFT identifier 159 to the presentation application 133 executing on the presentation device 103.

The presentation device 103 could then query the NFT smart contract 153 identified by the smart contract address 176 to obtain the owner address 166, the authorized address 169, and/or metadata 173 of the NFT 149 identified by the NFT identifier 159. The NFT smart contract 153 could then provide the owner address 166, authorized address 169, and/or metadata in response.

To validate ownership of the NFT 149, the presentation application 133 could send a request to the wallet application 129 to sign a transaction, challenge or other nonce value. The wallet application 129 could sign the transaction, challenge or other nonce value using the wallet private key 139 and provide the signature of the transaction, challenge or other nonce value to the presentation application 133. In some instances, wallet application 129 could also return the transaction, challenge or other nonce value to the presentation application 133.

The presentation application 133 could then recover the wallet public key 136 from the signature and derive the wallet address 143 of the wallet application 129 from the wallet public key 136. If the wallet address 143 matches either the owner address 166 or the authorized address 169 of the NFT 149, then the presentation application 133 could determine that the presentation device 103 is authorized to present the media represented by the NFT 149 because the owner of the presentation device 103 is also the owner or authorized user of the NFT 149.

For example, if the NFT 149 were stored on the ETHEREUM blockchain and the wallet application 129 were an ETHEREUM wallet, the presentation application 133 could use the ECRECOVER function provided by ETHEREUM's SOLIDITY language to recover the wallet public key 136 upon receipt of the signature of a transaction from the wallet application 129. The presentation application 133 could then derive the wallet address 143 of the wallet application 129 from the recovered wallet public key 136 by generating a Keccak-256 hash of the wallet public key 136 and selecting the last twenty bytes of the Keccak-256 hash as the wallet address 143. The presentation application 133 could then compare this wallet address 143 to the owner address 166 or the authorized address 169 of the NFT 149.

If the wallet address 143 matches the owner address 166 or authorized address 169, then the presentation application 133 could determine that the NFT 149 is authentic (e.g., is owned by the user or the user is authorized or approved to have the media represented by the NFT 149 presented using the presentation device 103). In response, the presentation application 133 could cause the presentation device 103 to present the media represented by the NFT 149. In some instances, the presentation application 133 could also cause the presentation device 103 to activate an indicator that provides an indication that the NFT 149 is authorized, authentic, or owned by the user.

If the wallet address 143 fails to match the owner address 166 or authorized address 169, then the presentation application 133 could still be configured to cause the presentation device 103 to present the media represented by the NFT 149. However, in these situations, the presentation application 133 could fail to cause presentation device 103 to activate an indicator that provides an indication that the NFT 149 is authorized, authentic, or owned by the user. Alternatively, the presentation application 133 could be configured to ignore or otherwise fail to cause the presentation device 103 to present the media represented by the NFT 149. In these situations, only NFTs 149 that are authorized, authentic, or owned by the user would be presented using the presentation device 103. Separately, a viewer of the presentation device 103 may also wish to verify the identity of the presentation device 103. For example, an unauthorized presentation device 103 could be configured to present a digital copy of the media represented by the NFT 149. Such counterfeit presentation devices 103 could also provide authenticity indicators to conceal that the media is a copy or a duplicate that is not authorized for presentation.

Accordingly, a user could obtain the HSM public key 123 of embedded in the HSM 119 of the presentation device 103. This could be done in a number of ways. For example, the user could scan with the client device 106 a quick-response (QR) code that encodes the HSM public key 123. As another example, the user could pair his or her client device 106 with the presentation device 103 using BLUETOOTH, nearfield communications (NFC), or similar wireless protocols to obtain the HSM public key 123.

The client application 146 could then encrypt a challenge using the HSM public key 123 and send the encrypted challenge to the presentation device 103. The presentation device 103 could present the encrypted challenge to the HSM 119, which could decrypt the challenge and create a signature for the challenge using the HSM private key 126. The presentation device 103 could then send the signature for the challenge back to the client application 146.

The client application 146 could use the HSM public key 123 to verify the signature for the challenge. If the signature is valid, then the client application could search the distributed data store 109 for one or more assertions 156 associated with the HSM public key 123. The client application 146 could then evaluate the assertions 156 to determine whether the presentation device 103 is a genuine or authorized device.

Figure 2:
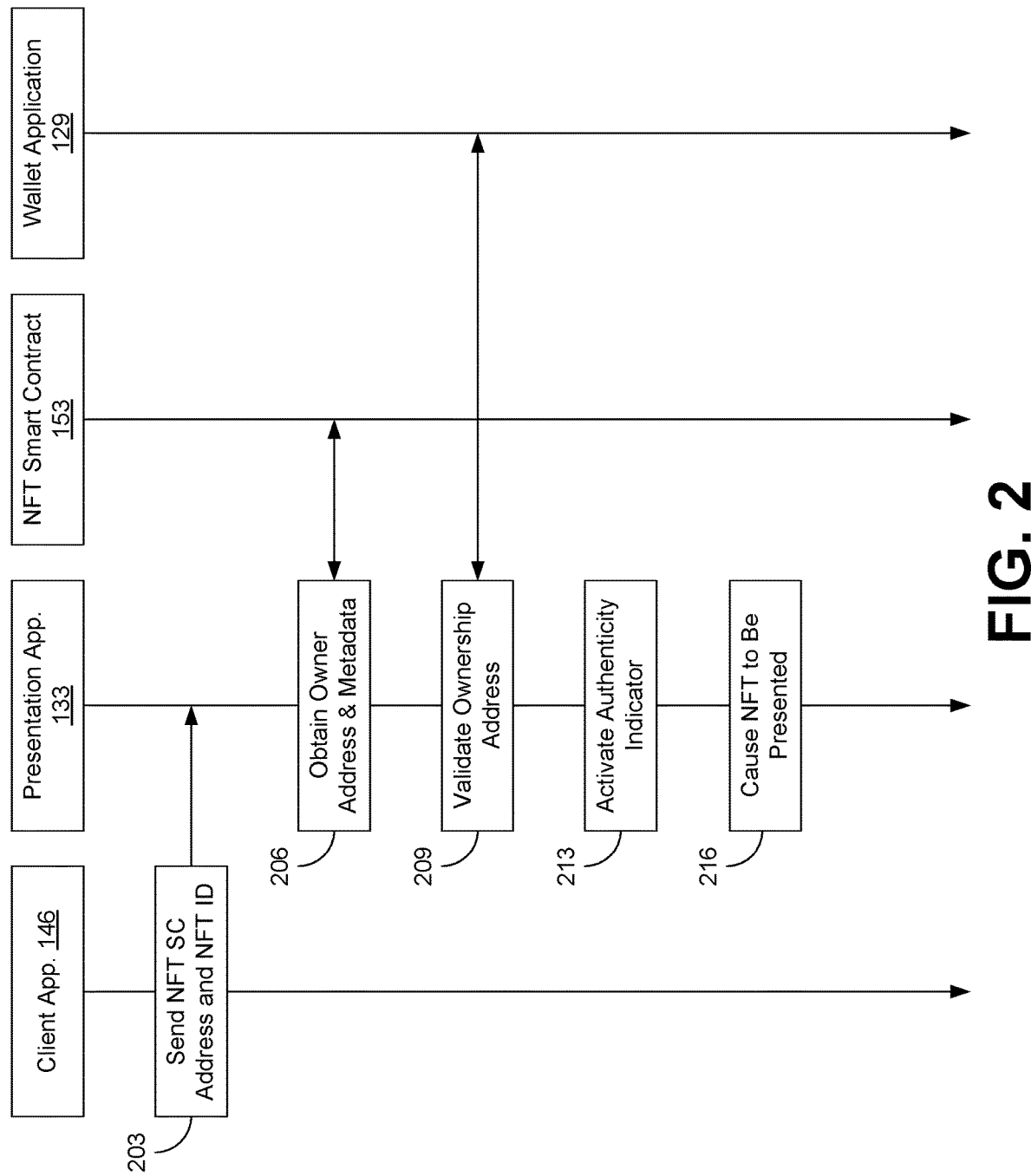
FIG. 2 is a sequence diagram illustrating one example of the interactions between the components of the network environment of FIG. 2 according to various embodiments of the present disclosure.

Referring next to FIG. 2, shown is a sequence diagram that provides one example of the interactions between the components of the network environment 100. The sequence diagram of FIG. 2 provides merely an example of the many different types of functional arrangements that can be employed or executed within the network environment 100. As an alternative, the sequence diagram of FIG. 2 can be viewed as depicting an example of elements of a method implemented within the network environment 100.

Beginning with block 203, the client application 146 sends an NFT identifier 159 to the presentation application 133. The client application 146 can also send the smart contract address 176 responsible for the NFT 149 identified by the NFT identifier 159.

Then, at block 206, the presentation application 133 sends a request to the NFT smart contract 153 identified by the smart contract address 176. The request can invoke one or more functions provided by the NFT smart contract 153 and provide the NFT identifier 159 as an argument. For example, the presentation application 133 could invoke a first function exposed by the NFT smart contract 153 that returns the owner address 166 of the NFT 149 in response to the NFT identifier 159 being provided as an argument or input to the function. Similarly, the presentation application 133 could invoke a second function exposed by the NFT smart contract 153 that returns the authorized address 169 of the NFT 149 in response to the NFT identifier 159 being provided as an argument or input to the function. In addition, the presentation application 133 could invoke a third function exposed by the NFT smart contract 153 that returns the metadata 173 of the NFT 149 in response to the NFT identifier 159 being provided as an argument or input to the function. In some implementations, one or more of these functions could be implemented as a single function of the NFT smart contract 153. The presentation application 133 could then receive the owner address 166, authorized address 169 and/or metadata 173 from the NFT smart contract 153 in response.

Next, at block 209, the presentation application 133 can validate the ownership of the NFT 149 identified by the NFT identifier 159 supplied by the client application 146 at block 203. Accordingly, the presentation application 133 could send a request to the wallet application 129 to sign a transaction, challenge or other nonce value. The wallet application 129 could sign the transaction, challenge or other nonce value using the wallet private key 139 and provide the signature of the transaction, challenge or other nonce value to the presentation application 133. In some instances, wallet application 129 could also return the transaction, challenge or other nonce value to the presentation application 133.

The presentation application 133 could then recover the wallet public key 136 from the signature and derive the wallet address 143 of the wallet application 129 from the wallet public key 136. If the wallet address 143 matches either the owner address 166 or the authorized address 169 of the NFT 149, then the presentation application 133 could determine that the presentation device 103 is authorized to present the media represented by the NFT 149 because the owner of the presentation device 103 is also the owner or authorized user of the NFT 149.

For example, if the NFT 149 were stored on the ETHEREUM blockchain and the wallet application 129 were an ETHEREUM wallet, the presentation application 133 could use the ECRECOVER function provided by ETHEREUM's SOLIDITY language to recover the wallet public key 136 upon receipt of the signature of a transaction from the wallet application 129. The presentation application 133 could then derive the wallet address 143 of the wallet application 129 from the recovered wallet public key 136 by generating a Keccak-256 hash of the wallet public key 136 and selecting the last twenty bytes of the Keccak-256 hash as the wallet address 143. The presentation application 133 could then compare this wallet address 143 to the owner address 166 or the authorized address 169 of the NFT 149.

If the presentation application 133, determines that the NFT 149 is owned by the owner of the presentation device 103 or is authorized for presentation by the presentation device 103, then the presentation application 133 could, at block 213, cause the presentation device 103 to activate an authenticity indicator. For example, the presentation application 133 could cause the presentation device 103 to turn on a small light or change the color of a light (e.g., from red to green) to indicate that the NFT 149 is owned by the owner of the presentation device 103 or is authorized for presentation by the presentation device 103. Likewise, if the NFT 149 is not owned by the owner of the presentation device 103 or is not authorized for presentation by the presentation device 103, then the presentation application 133 could cause the presentation device 103 to deactivate an authenticity indicator, such as by turning off a small light or changing the color of a light (e.g., from green to red).

Subsequently, at block 216, the presentation application 133 could cause media represented by the NFT 149 to be presented using the presentation device 103. For example, the presentation application 133 could request a media file located at a uniform resource locator (URL) specified in the metadata of the NFT 149. Once the media file is received, it could be presented using the presentation device 103. For example, if the media file were an image or a video, the media file could be shown on the display 116 of the presentation device 103. As another example, if the media file were an audio file, then the audio file could be played using a speaker built into the presentation device 103.

In some implementations, the presentation application 133 could, at block 216, compare a hash of the media file located at the URL with a hash included in the metadata 173 of the NFT 149. If the hashes match, this would indicate that the media file located at the URL is the media file represented by the NFT 149. In this situation, the presentation application 133 could then present the media file. However, if the hashes failed to match, then this would indicate that media file located at the URL is not the media file represented by the NFT 149. In such a situation, the presentation application 133 might fail to present the media file.

As previously discussed, if the NFT 149 were not validated at block 209, the media represented by the NFT 149 could still be presented at block 216 in some implementations. However, as discussed at block 213, the authenticity indicator would indicate that the NFT 149 was not owned by the owner of the presentation device 103 or authorized or display using the presentation device 103. Alternatively, the functionality of block 216 could be skipped or omitted for NFTs 149 that were not owned or were not authorized for presentation.

Figure 3:
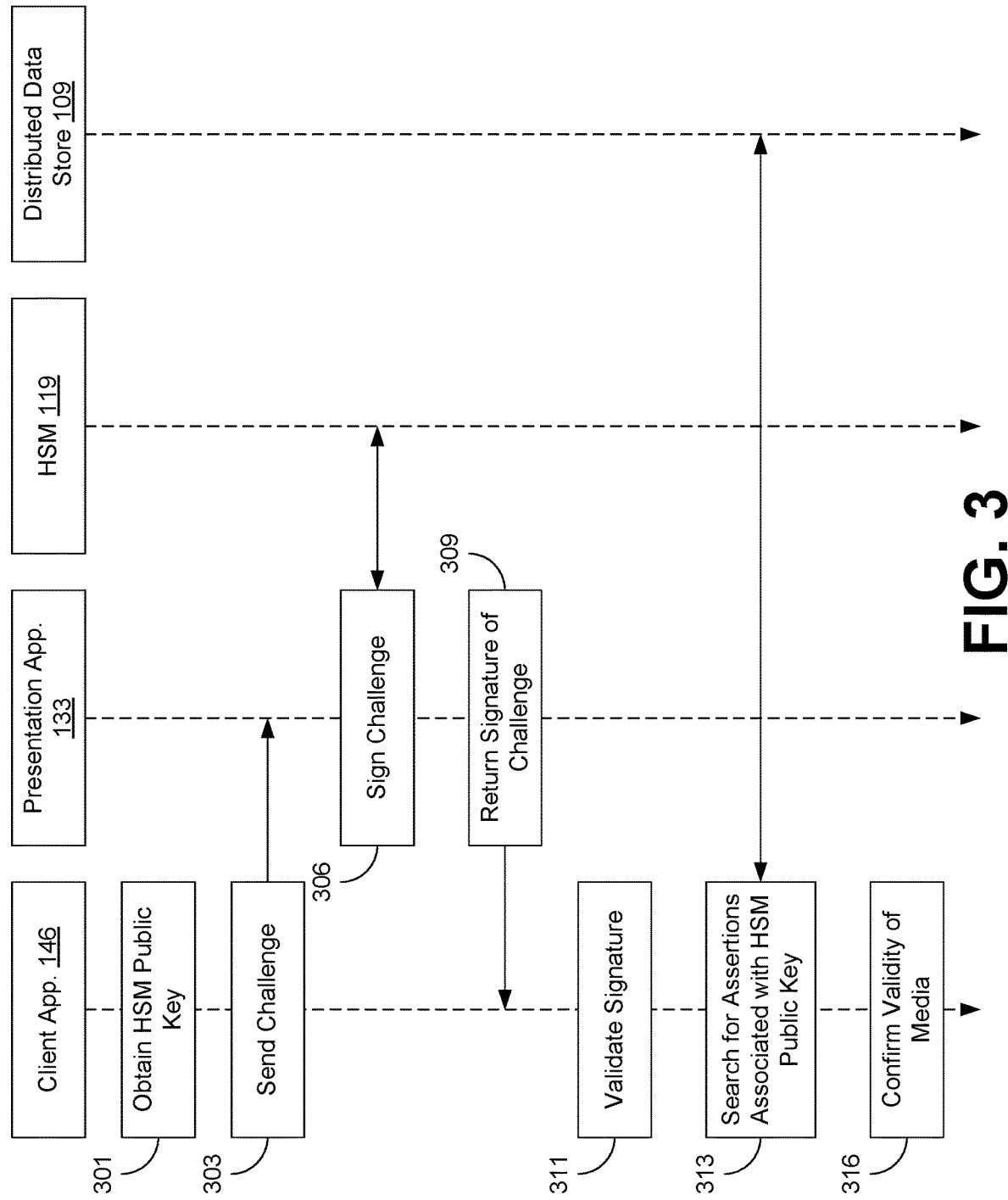
FIG. 3 is a sequence diagram illustrating one example of the interactions between the components of the network environment of FIG. 2 according to various embodiments of the present disclosure.

Referring next to FIG. 3, shown is a sequence diagram that provides one example of the interactions between the components of the network environment 100. The sequence diagram of FIG. 3 provides merely an example of the many different types of functional arrangements that can be employed or executed within the network environment 100. As an alternative, the sequence diagram of FIG. 3 can be viewed as depicting an example of elements of a method implemented within the network environment 100.

Beginning with block 301, the client application 146 can obtain the HSM public key 123 from the HSM 119 of a presentation device 103 that is presenting media represented by an NFT 149. This could be done using various approaches. For example, the client application 146 could cause the client device 106 to scan a matrix bar code (e.g., a QR code) or other encoding of the HSM public key 123, or receive a scan captured by another application executing on the client device 106. As another example, the user could pair his or her client device 106 with the presentation device 103 using BLUETOOTH, nearfield communications (NFC), or similar wireless protocols to obtain the HSM public key 123. The client application 146 could then wirelessly communicate with the presentation device 103 to receive the HSM public key 123.

Moving on to block 303, the client application 146 can send a challenge to the presentation application 133. For example, the client application 146 could generate a token, nonce value, or other random piece of data. The client application 146 could then encrypt the token, nonce value, or other random piece of data with the HSM public key 123 to generate an encrypted token, nonce value, or other random piece of data, which the client application 146 could send to the presentation application 133 as an encrypted challenge.

Then, at block 306, the presentation application 133 can cause the encrypted challenge sent by the client application 146 to be decrypted and signed by the HSM private key 126 of the HSM 119. For example, the presentation application 133 could invoke one or more functions provided by the HSM 119 to decrypt the encrypted challenge using the HSM private key 126 and then sign the resulting token, nonce value, or other random piece of data with the HSM private key 126.

Next, at block 309, the presentation application 133 could return the signature generated at block 306 to the client application 146.

Accordingly, at block 311, the client application 146 could validate the signature provided by the presentation application 133. For example, the client application 146 could use the HSM public key 123 obtained at block 301 to verify that the signature of the token, nonce value, or other random piece of data received at block 309 was generated by the respective HSM private key 126. If the signature is validated, then the client application 146 can determine that it is communicating with presentation device 103 associated with the HSM public key 123.

Moving on to block 313, the client application 146 could search the distributed data store 109 for one or more assertions 156 associated with the HSM public key 123. Accordingly, the HSM public key 123 could be used as a search parameter to retrieve all assertions 156 made about the presentation device 103.

Subsequently, at block 316, the client application 146 could evaluate the assertions 156 to confirm whether the media displayed by the presentation device 103 is associated with a valid or authorized NFT 149. For instance, the client application 146 could obtain the owner address 166 or authorized address 169 and the NFT identifier 159 of the NFT 149 that represents the currently presented media.

The client application 146 could obtain the NFT identifier 159, owner address 166, and/or authorized address 169 through several approaches. In one example, the presentation device 103 could display these values (e.g., through a matrix bar code such as a QR code that could be scanned by the client device 106), which could be scanned by the client device 106 and provided to the client application 146. As another example, these values could be transmitted to the client application 146 by the presentation application 133 (e.g., through a BLUETOOTH or NFC connection between the client device 106 and the presentation device 103).

The client application 146 could then compare the NFT identifier 159 and the owner address 166 or authorized address 169 with the NFT identifier 159 and the owner address 166 or authorized address 169 listed in an assertion 156 associated with the HSM public key 123 of the presentation device 103. If the NFT identifier 159 and the owner address 166 or authorized address 169 match the values listed in an assertion 156, then the client application 146 can conclude that the presentation device 103 is authorized or has permission to display the media represented by the NFT 149 and that the presentation is valid or authentic.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor, a memory, and a display; and
machine-readable instructions stored in the memory that, when executed by the processor, cause the computing device to at least:
receive, from a client device, a smart contract address and a non-fungible token (NFT) identifier for an NFT;
execute a function of a smart contract located at the smart contract address to obtain an owner address for the NFT, wherein the NFT identifier is provided as an argument to the function of the smart contract;
validate the owner address for the NFT by causing the computing device to at least:
send a request to a wallet application hosted by the computing device to sign a transaction;
receive the signature of the transaction from the wallet application;
determine a wallet public key based at least in part on the signature of the transaction;
derive a wallet address from the wallet public key; and
determine that the wallet address matches the owner address; and
in response to validation of the owner address for the NFT, cause a media file represented by the NFT to be presented.

2. The system of claim 1, wherein the machine-readable instructions that cause the media file represented by the NFT to be presented, when executed, further cause the computing device to at least:
identify a uniform resource locator (URL) included in metadata of the NFT, the URL specifying a location where the media file is located; and
retrieve the media file from the location specified by the URL.

3. The system of claim 2 wherein the NFT includes a hash, and the machine-readable instructions, when executed, further cause the computing device to at least:
determine that the hash included in the NFT matches a hash of the media file; and
wherein the media file is retrieved from the location specified by the URL in response to a determination that the hash included in the NFT matches the hash of the media file.

4. The system of claim 1, wherein the computing device further comprises an indicator light that, when active, represents that the media file is authentic, and the machine-readable instructions, when executed by the computing device, further cause the computing device to at least activate the indicator light in response to validation of the owner address for the NFT.

5. The system of claim 1, wherein the client device is in communication with the computing device via a BLUETOOTH or near-field communication (NFC) connection and the smart contract address and the NFT identifier are received via the BLUETOOTH or the NFC connection.

6. The system of claim 1, wherein the NFT is stored on an ETHEREUM blockchain.

7. A method, comprising:
- receiving, from a client device, a smart contract address and a non-fungible token (NFT) identifier for an NFT that represents a media file;
- executing a function of a smart contract located at the smart contract address to obtain an owner address for the NFT, wherein the NFT identifier is provided as an argument to the function of the smart contract;
- validating the owner address for the NFT;
- in response to validating the owner address for the NFT, presenting the media file represented by the NFT; and
- activating an indicator light of a presentation device in response to validation of the owner address for the NFT.

8. The method of claim 7, wherein presenting the media file further comprises:
- identifying a uniform resource locator (URL) included in metadata of the NFT, the URL specifying a location where the media file is located; and
- retrieving the media file from the location specified by the URL.

9. The method of claim 8, wherein the NFT includes a hash, and the method further comprises:
- determining that the hash included in the NFT matches a hash of the media file; and
- wherein retrieving the media file from the location specified by the URL occurs in response to determining that the hash included in the NFT matches the hash of the media file.

10. The method of claim 7, wherein the smart contract address and the NFT identifier are received via a BLUETOOTH or NFC connection with the client device.

11. The method of claim 7, wherein validating the owner address for the NFT further comprises:
- sending a request to a wallet application to sign a transaction;
- receiving a signature of the transaction from the wallet application;
- determining a wallet public key based at least in part on the signature of the transaction;
- deriving a wallet address from the wallet public key; and
- determining that the wallet address matches the owner address.

12. The method of claim 7, wherein the NFT is stored on an ETHEREUM blockchain.

13. The method of claim 7, wherein the indicator light, when active, represents that the media file is authentic.

14. A non-transitory, computer-readable medium, comprising machine-readable instructions that, when executed by a processor of a computing device, cause the computing device to at least:
- receive, from a client device, a smart contract address and a non-fungible token (NFT) identifier for an NFT;
- execute a function of a smart contract located at the smart contract address to obtain an owner address for the NFT, wherein the NFT identifier is provided as an argument to the function of the smart contract;
- validate the owner address for the NFT by causing the computing device to at least:
  - send a request to a wallet application hosted by the computing device to sign a transaction;
  - receive a signature of the transaction from the wallet application;
  - determine a wallet public key based at least in part on the signature of the transaction;
  - derive a wallet address from the wallet public key; and
  - determine that the wallet address matches the owner address; and
- in response to validation of the owner address for the NFT, cause a media file represented by the NFT to be presented.

15. The non-transitory, computer-readable medium of claim 14, wherein the machine-readable instructions that cause the media file represented by the NFT to be presented, when executed, further cause the computing device to at least:
- identify a uniform resource locator (URL) included in metadata of the NFT, the URL specifying a location where the media file is located; and
- retrieve the media file from the location specified by the URL.

16. The non-transitory, computer-readable medium of claim 15, wherein the NFT includes a hash, and the machine-readable instructions, when executed, further cause the computing device to at least determine that the hash included in the NFT matches a hash of the media file.

17. The non-transitory, computer-readable medium of claim 16, wherein the media file is retrieved from the location specified by the URL in response to a determination that the hash included in the NFT matches the hash of the media file.

18. The non-transitory, computer-readable medium of claim 14, wherein the computing device further comprises an indicator light that, when active, represents that the media file is authentic, and the machine-readable instructions, when executed by the computing device, further cause the computing device to at least activate the indicator light in response to validation of the owner address for the NFT.

19. The non-transitory, computer-readable medium of claim 14, wherein the client device is in communication with the computing device via a BLUETOOTH or near-field communication (NFC) connection and the smart contract address and the NFT identifier are received via the BLUETOOTH or the NFC connection.

20. The non-transitory, computer-readable medium of claim 14, wherein the NFT is stored on an ETHEREUM blockchain.

* * * * *